United States Patent [19]

Hickson

[11] 4,285,848

[45] Aug. 25, 1981

[54] WOOD ADHESIVE FROM PHENOL, FORMALDEHYDE, MELAMINE AND UREA

[75] Inventor: Charles H. Hickson, New Albany, Ind.

[73] Assignee: Borden, Inc., Columbus, Ohio

[21] Appl. No.: 120,529

[22] Filed: Feb. 11, 1980

Related U.S. Application Data

[63] Continuation-in-part of Ser. No. 929,527, Jul. 31, 1978, abandoned.

[51] Int. Cl.$^3$ ............... C08G 14/08; C08G 14/10; C08L 61/14; C08L 61/28
[52] U.S. Cl. ............... 260/29.3; 260/17.2; 525/497; 525/504; 528/163
[58] Field of Search ............... 528/163; 525/497; 260/29.3

[56] References Cited

U.S. PATENT DOCUMENTS

| | | | |
|---|---|---|---|
| 3,321,551 | 5/1967 | Knutsson | 525/497 |
| 3,617,428 | 11/1971 | Carlson | 260/29.3 |
| 3,666,694 | 5/1972 | Ingram | 260/7 |
| 3,734,918 | 5/1973 | Mayer et al. | 260/29.3 |
| 3,907,724 | 9/1975 | Higginbottom | 528/163 |
| 3,956,204 | 5/1976 | Higginbottom | 525/497 |
| 4,028,367 | 6/1977 | Higginbottom | 528/163 |

*Primary Examiner*—John C. Bleutge
*Assistant Examiner*—A. H. Koeckert
*Attorney, Agent, or Firm*—Millard & Cox

[57] ABSTRACT

Preparation of this adhesive is characterized by initial condensation of phenol and formaldehyde, which is followed by sequential condensation of melamine and then urea to produce a wood adhesive which passes the standard 6-cycle test.

7 Claims, No Drawings

WOOD ADHESIVE FROM PHENOL, FORMALDEHYDE, MELAMINE AND UREA

CROSS-REFERENCE TO RELATED APPLICATIONS

This a continuation-in-part of copending application Ser. No. 929,527 filed on July 31, 1978, now abandoned.

BACKGROUND OF THE INVENTION

This invention relates to a process for preparing a resin which is a condensate of phenol, formaldhyde, melamine and urea. This resin is especially useful in making wood adhesives which are stable and wood products manufactured therewith that have superior strength properties and weatherability.

Most wood adhesives used today are based on urea formaldehyde resins which are not considered to have acceptable weatherability. Although melamine resins are increasingly used to meet higher requirements for bond strength and moisture resistance, they are not deemed suitable for preparing weatherproof adhesive joints. Weatherproof wood joints have been produced only with phenolic resins capable of alkaline cure, however, such joints are dark in color and such phenolic resins can damage wood under conditions of cure.

Since urea is economically inexpensive compared to melamine, it is desirable to use as much urea as possible and as little of melamine as possible, however, it is well known that use of urea in wood adhesives results in poor weatherability and poor durability of bonds formed with such adhesives. It has been unexpectedly discovered that, when condensed in a proper sequence, adhesives containing condensed urea will be stable and will provide excellent weatherability to bonds formed thereby.

BROAD STATEMENT OF THE INVENTION

Pursuant to the invention disclosed herein, the resin is prepared by condensing phenol, formaldehyde, melamine and urea in the sequence set forth. It is imperative to condense formaldehyde with phenol and then condense melamine with the phenolformaldehyde condensate before introducing urea. If this condensing sequence is not observed, a resin will not be obtained which can be used to make adhesives with weatherproof quality. On the basis of one mole of phenol, the proportions in moles of the other ingredients are as follows:

|              | preferred range | broad range |
|--------------|-----------------|-------------|
| phenol       | 1               | 1           |
| formaldehyde | 7–8.24          | 6–8.24      |
| melamine     | 1.2–1.5         | 1–1.6       |
| urea I       | 1.8–1.9         | 1.4–2.3     |
| urea II      | 0.65–0.75       | 0.2–1       |

Triethanolamine and caustic soda are used in the preferred embodiment to adjust the pH to the desired level. Other alkaline substances can also be used.

DETAILED DESCRIPTION OF THE INVENTION

In preparing the condensate, formaldehyde and phenol are added to a reaction vessel and thoroughly mixed. This will take the reaction between phenol and formadehyde to the methylolation state. Sufficient triethanolamine is added to raise the pH to 5.6–6.4, preferably 5.8–6.2, then, with caustic soda, the pH is increased to 8.5–9.5, preferably about 9.0. Cooling of the reactor contents is commenced and when a temperature of 40° C. or below is reached, melamine is added with vigorous agitation to ensure that all of the melamine is wetted. At this point, the contents of the reactor are heated to 85°–100° C., preferably 93°–95° C., and held at this temperature for 10–45 minutes, preferably about 20 minutes. Condensation of the melamine is considered complete when the solution becomes clear. This is followed by addition of the first portion of urea over a period of 5–20 minutes, preferably 7–13 minutes, while holding the temperature at about 93°–95° C. to obtain a polymer of desired chain length. After all of the urea solubilizes, the reaction is held at 80°–100° C., preferably 87°–89° C., until a water tolerance of 70–180%, preferably 100–150%, is reached. The contents of the reactor at this stage are cooled to 45°–50° C. and an additional 0.2–1 moles of urea, preferably 0.65–0.75 moles, is added to react with excess formaldehyde, with continued cooling to about 25° C. Lastly, the pH is adjusted with triethanolamine to 7.5–8.5, preferably 8.0–8.4. The condensate, in its preferred embodiment, will meet the following specifications:

| water dilutability           | 100–150%    |
|------------------------------|-------------|
| solids                       | 60–62%      |
| Brookfield viscosity at 25° C. | 90–130 cps |
| specific gravity             | 1.270–1.285 |
| pH                           | 8–8.4       |
| color                        | amber       |

There is on the market a BASF resin known as Kauaromin 540, which is apparently covered by the Mayer U.S. Pat. No. 3,734,918. The Mayer patent discloses in column 1 that, prior to his invention, weatherproofness could only be achieved with phenolic resins capable of alkaline cure. This patent describes preparation of a product by condensing melamine and/or urea with formaldehyde in aqueous solution and then reacting the condensate with phenol with or without a small amount of formaldehyde and melamine. On the basis of 1 mole of melamine, 1.7–3 moles of formaldehyde and 0.05–0.2 moles of phenol are utilized. The one mole of melamine can be replaced in part by urea wherein at least 15% is melamine and less than 85% is urea, computed on a molar basis. As will be shown, the BASF resin cannot provide an acceptable degree of weatherability, as measured by the standard 6-cycle test under boiling and freezing conditions.

The molar proportion of formaldehyde per 1 mole of phenol should be within the range of about 6 to 8.24 moles in order to make a wood adhesive which has the desired properties and which can be made economically on a commercial scale. At a molar ratio of about 5 or less of the formaldehyde, the polymer is either too viscous for application or solidifies during its preparation. At a molar ratio of about 10 or more of the formaldehyde, the polymer is extremely thin and commercially excessive reaction times (e.g. up to 20 hours or more) are required.

The examples presented below are set forth for illustrative purposes and are not to be construed as limiting the scope of the invention claimed herein.

EXAMPLE 1

The polymer was prepared pursuant to the invention described herein by reacting the ingredients measured in parts by weight. 53.92 parts of formaldehyde as a 50% aqueous solution, and 10.25 parts of phenol were mixed in a reactor and, then, triethanolamine was added with mixing to bring the pH to about 6. To raise the pH to about 9, a sufficient amount of caustic soda was admixed. Contents of the reactor then were cooled to below 40° C. and melamine was added with vigorous agitation. Melamine, in an amount of 19.04 parts, was condensed with phenolformaldehyde by heating the contents of the reactor to about 95° C. After holding the temperature at about 95° C. for about 20 minutes until the solution cleared, which indicated completion of melamine condensation, 12.31 parts of urea was added with mixing over a period of about 10 minutes while the temperature was maintained at about 95° C. After the urea was solubilized, it was condensed at 87°–89° C. to a water tolerance of 100–150%. At this point, the contents of the reactor were cooled to 45°–50° C. and an additional amount of 4.48 parts of urea were added to react with the excess formaldehyde. Cooling was continued until the condensate reached a temperature of about 25° C., at which point, the pH was adjusted with triethanolamine to about 8.2. This resin was stable for about one month. The molar ratio of the ingredients used per 1 mole of phenol was 1.39 moles of melamine, 8.24 moles of formaldehyde, 1.88 moles of urea for the first addition, and 0.68 moles of urea for the second addition.

EXAMPLE 2

In this example, BASF condensate was prepared pursuant to the procedure set forth in Example 1 of the BASF U.S. Pat. No. 3,734,918. To a reaction vessel, the following were charged: 54.22 parts by weight of a 63% solids urea-formaldehyde resin, 13.96 parts melamine, 5.92 parts of 84.55% phenol, and 2.41 parts water. Contents of the reactor were thoroughly mixed and brought to a pH of 8.5–8.7 by the addition of 25% caustic soda. While maintaining the pH at about 8.5, condensation was allowed to proceed at about 90° C. to a viscosity of 700 cps at 20° C. The condensate was then cooled to about 21° C. This resin was unacceptable for use after about one week.

The resins of Examples 1 and 2, above, were evaluated in the laboratory under the same conditions by making particleboard samples and subjecting the samples to various tests to determine relative performance thereof.

The resins were sprayed onto the chips without adding anything else to the resins. The table below summarizes important features of said tests:

TABLE 1

| resin | IB | MOR | 6-cycle, % ret. IB | 6-cycle, % ret. MOR |
|---|---|---|---|---|
| Ex. 1 | 121 | 2648 | 6.1 | 9.5 |
| Ex. 1 | 122 | 2817 | 4.5 | 8.8 |
| Ex. 2 | 129 | 3148 | fell apart after 3 cycles | |
| Ex. 2 | 125 | 2837 | fell apart after 3 cycles | |

In the above Table 1, "IB" represents internal bond, "MOR" stands for modulus of rupture and the 6-cycle test shows percent retention of the values after the 6-cycle test was concluded. Although the absolute values were not impressive due to the fact that the tests were carried out in the laboratory at press times of 4½ and 5½ minutes, the relative values show the superiority of the resin prepared pursuant to the invention described herein.

Resin of Example 1, containing 2% ammonium sulfate curing catalyst solids in the liquid resin, also was evaluated in a commercial operation. In a particular test, the particleboard samples were 0.251 inches in thickness and the level of the resin was at 12% by weight. The samples exhibited a modulus of rupture of 2666 which, after the standard 6-cycle test, showed a retention of 50.1%. To the best of my knowledge, this is the only resin of any type which can provide retention after the 6-cycle test in excess of 50% at relatively low curing temperature of about 290°–310° F.

I claim:

1. A wood adhesive composition prepared from phenol, formaldehyde, melamine, and urea in a molar proportion per 1 mole of phenol of between about 6 and 8.24 moles of formaldehyde, between about 1 and 1.6 moles of melamine, and between about 1.6 and 3.3 moles of urea, said composition prepared by the steps of:
    (a) charging said phenol and said formaldehyde into a reactor held under condensing and basic conditions;
    (b) adding said melamine to said reactor, and adjusting and maintaining condensing conditions to a pH of between about 8.5 and 9.5 at a temperature of between about 85° and 100° C. until all of said melamine is condensed indicated by the contents of said reactor being clear; and
    (c) adding said urea to said reactor and maintaining urea condensing conditions until the condensate product in said reactor has a water tolerance of between about 70% and 180%.

2. The wood adhesive composition of claim 1 wherein said condensing and basic conditions in step (a) are adequate to effect a methylolation reaction between said phenol and said formaldehyde.

3. The wood adhesive of claim 2 wherein said urea addition of step (c) is done in two stages: the first stage being the addition of between about 1.4 and 2.3 moles of urea per mole of phenol, and the second stage being the addition of between about 0.2 and 1 mole of urea per mole of phenol after the desired water tolerance is reached following said first stage addition of said urea.

4. The wood adhesive composition of claim 3 wherein for step (c): the temperature of the contents of said reactor is adjusted to between about 45° and 50° C. prior to said second stage addition of said urea, the temperature of the contents of said reactor is adjusted to about room temperature after said second stage addition of said urea, and the pH of said room temperature contents is adjusted to be between about 7.5 and 8.5.

5. The wood adhesive composition of claim 4 wherein the molar proportion per 1 mole of phenol of said formaldehyde is about 8.24, of said melamine is between about 1.25 and 1.5 moles, of said first stage urea is between about 1.8 and 1.9 moles, and of said second stage urea is between about 0.65 and 0.75 moles.

6. The wood adhesive composition of claim 5 wherein the contents of the reactor in step (a) are cooled to a temperature of less than about 40° C. prior to said melamine addition of step (b); said condensing conditions of step (b) include a temperature of between about 93° and 95° C., said first stage urea addition of step (c) is done at a uniform rate over a time period ranging from between about 5 and 20 minutes while the reactor contents are maintained at a temperature of between about 93° and 95° C.; said water tolerance of the condensate product of step (c) is between about 100% and 150%; and said wood adhesive composition has the following specifications:

| | |
|---|---|
| water dilutability | 100-150% |
| solids | 60-62% |
| Brookfield viscosity at 25° C. | 90-130 cps |
| specific gravity | 1.270-1.285 |
| pH | 8-8.4 |

7. The wood adhesive composition of claim 6 wherein said temperature of step (a) is about 30° C. at which time said melamine addition of step (b) is commenced, and said condensation conditions for said melamine addition of step (b) include a temperatue of about 90°-95° C. and a time for condensing about 20 minutes.

* * * * *